United States Patent [19]

Nolan

[11] 4,096,633
[45] Jun. 27, 1978

[54] ANTI-COLLISION PLOTTER

[76] Inventor: W. Paul Nolan, 427 Winthrop Dr., Pittsburgh, Pa. 15237

[21] Appl. No.: 775,968

[22] Filed: Mar. 9, 1977

[51] Int. Cl.² ............................................. G01C 21/20
[52] U.S. Cl. .................................... 33/1 SD; 116/134
[58] Field of Search ............ 33/1 SD, 1 SB, 76 VA; 235/61 NV; 116/133, 134

[56] References Cited

U.S. PATENT DOCUMENTS 3,540,127 11/1970 Kane ................................ 235/61 NV
3,827,150 8/1974 Kubota .............................. 33/1 SD Primary Examiner—Richard E. Aegerter
Assistant Examiner—John W. Shepperd
Attorney, Agent, or Firm—Bruns & Jenney

[57] ABSTRACT

An anti-collision plotter for use by the pilot and/or crew of an inflight aircraft for rapidly and automatically providing a visual representation of those sectors surrounding the aircraft in which the probability of colliding with another aircraft is relatively high. The plotter also provides information concerning the closing speed and the closing direction of an aircraft that is observed within an identified critical sector so that proper steps can be initiated immediately to avoid a midair collision.

13 Claims, 6 Drawing Figures

ANTI-COLLISION PLOTTER

BACKGROUND OF THE INVENTION

This invention relates to a device for rapidly and automatically providing visual information to the pilot and crew of an inflight aircraft concerning other aircraft in the visual range that may be on a collision course therewith.

More specifically, this invention relates to an adjustable anti-collision plotter capable of visually identifying those sectors about an inflight aircraft in which the danger of a midair collision are highest and displaying, with respect to other aircraft that may be on a collision course therewith, the space relationship between aircraft as well as the closing direction and speed of the two aircraft.

It is well known that the possibility of having a midair collision increases as the density of air traffic increases. This is particularly true when flying through congested areas in and about major airports. The possibility becomes even greater when a pilot is forced to fly at "hostile" altitudes, as for example when climbing or descending to a new altitude through flight corridors or the like. Ironically, the pilot and/or crew of an aircraft is usually occupied in the cockpit when flying through areas of greatest danger. As a consequence, little time in afforded to visually scan for other aircraft during periods when such observations are warranted.

SUMMARY OF THE INVENTION

It is therefore an object of the present invention to reduce the potential of having a midair collision.

A further object of the present invention is to rapidly and efficiently provide the pilot and crew of an inflight aircraft with information concerning a potential midair collision.

Yet another object of the present invention is to provide a visual presentation, on an ordered priority basis, of those sectors surrounding an aircraft in which exists a high probability of impacting another inflight aircraft.

Still another object of the present invention is to rapidly present information concerning the spacial relationship, closing speed and closing direction of an aircraft observed flying within an identified sector of concern.

A further object of the present invention is to enable a pilot to detect a closing aircraft at the earliest possible moment so that proper evasive action can be initiated in time to avoid a midair collision.

These and other objects of the present invention are attained by means of an adjustable plotter having a compass rose, a course indicator dial and a sector mask that are interrelated so that the mask automatically identifies critical sectors of greatest danger surrounding the aircraft when the course indicator is set to the heading along which the aircraft is proceeding. A grid is imprinted upon the plotter which provides further information concerning closing aircraft observed flying in critically identified sectors. This information includes the spacial relationship, closing speed and closing direction of the closing aircraft.

BRIEF DESCRIPTION OF THE DRAWINGS

For a better understanding of the present invention as well as other features and further objects thereof, reference is made to the following detailed description of the invention to be read in conjunction with the following drawing wherein.

DESCRIPTION OF THE PREFERRED EMBODIMENTS

The Federal Aviation Authority (F.A.A.) regulations generally control the operation of aircraft flying above certain minimum altitudes. Under F.A.A. regulations, an aircraft is required to fly at some assigned altitude that is dictated by the aircraft's general direction of flight and the flight conditions under which it is proceeding. Aircraft flying in a generally easterly direction under instrument flight rules (I.F.R.) are assigned altitudes of odd thousand feet while those proceeding in a westerly direction under the same flight rules are assigned altitudes of even thousand feet. If the aircraft is cleared to fly under visual flight rules (V.F.R.), the altitude assignment is increased by 500 feet. Through these procedures, a minimum separation of at least 500 ft. is maintained between aircraft flying in substantially opposite directions or those which are proceeding in the same direction under different flight rules.

Despite the altitude separation prescribed by F.A.A. regulations, there nevertheless exists a rather high probability that two or more aircraft, that are flying in accordance with the regulations in the same general direction, may come together at some point along their respective flight paths.

Figure 4:
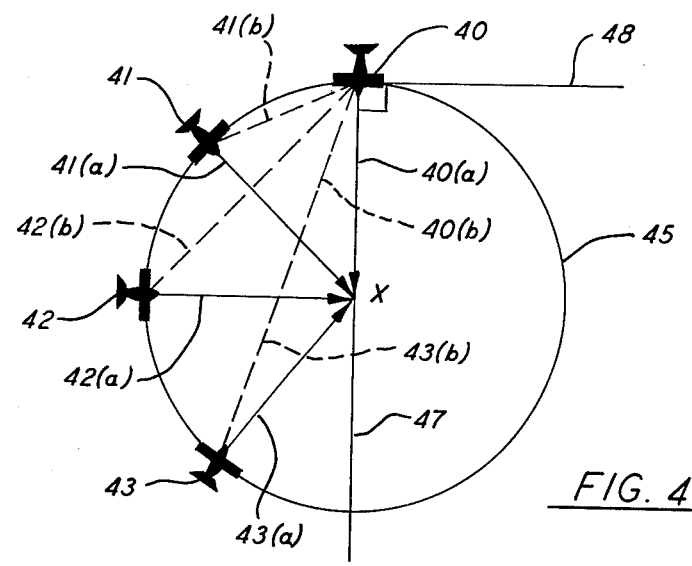
FIG. 4 is a diagrammatic representation illustrating the theory of operation of the apparatus of the present invention.

Referring initially to FIG. 4, there is shown in diagrammatic form four aircraft, 40-43, all of which are flying at the same prescribed F.A.A. altitude in a generally easterly direction. For purposes of this disclosure, it will be assumed that all aircraft are proceeding at about the same speed. This assumption is generally valid when viewed in light of the fact that aircraft of similar types and speed generally frequent the same approximate air space. Each of the aircraft is shown positioned upon the perimeter of an imaginary range circle 45 having a diameter that is vectorally equal to twice the airspeed of each aircraft. Accordingly, the radius of the circle is about equal vectorally to the speed of each aircraft. Aircraft 40, which for the purposes of this disclosure will be referred to as a target aircraft upon which all other aircraft are closing, is proceeding in a generally southerly direction on a course of about 179°. Although this heading is almost due south, aircraft 40 is nevertheless presumed to be flying in an easterly direction for purposes of F.A.A. altitude assignments and is therefore properly assigned the same altitude as the other aircrafts illustrated. If the closing aircraft positioned above the range circle are to collide with the target aircraft, they will have to proceed along radial lines of the range circle and impact the target at the center X of the circle.

In the diagram shown in FIG. 4, the solid lines 40(a)-43(a) depict the heading vectors of each of the aircraft with the length of the vector representing the aircraft's speed. Because each aircraft is assumed to be proceeding at the same speed, the vectors will intersect at the center of the range circle. The dotted lines 40(b)-43(b) on the other hand represent the resultant or closing vectors between each of the closing aircraft and the target aircraft. These resultant vectors thus represent the direction and speed of closure between aircraft.

It should be noted at this point the imaginary range circle 45 is constantly moving as the target aircraft proceeds along its intended course. As the other aircraft close on the target, the range circle will shrink in size until the point of impact is reached. The rate of shrinkage of the range circle is dependent upon the relative length of the various resultant vectors involved. For example, closing aircraft 43, which is proceeding in a more northerly direction than the other closing aircraft, shall impact the target first as evidenced by the comparative greater lengths of its closing vector.

From this disclosure it should be evidenced that the most dangerous situation encountered by aircraft proceeding at the same altitude under F.A.A. regulations occurs when one aircraft flying about due North closes on another aircraft flying about due South. Under these conditions, the rate of closure is approximately twice the speed of each aircraft. The time for detection and evasion afforded each pilot is therefore minimal.

Figure 5:
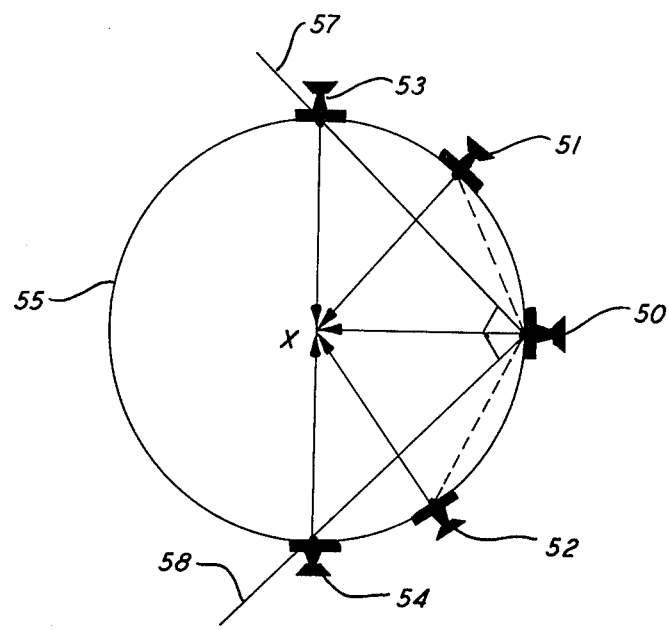
FIG. 5 is a second diagrammatic view further illustrating the theory of operation of the present invention.

Referring now to FIG. 5, there is illustrated a second situation in which the target aircraft is headed due West on a course of about 270°. Here again aircraft 51-54 are shown positioned about a range circle 55 having a radius that is vectorally equal to the speed of each aircraft. Each aircraft is on a collision course with respect to target aircraft 50. As explained above, the closing aircraft will impact the target at the center of the range circle. However, it should be noted that there exists a sector described by lines 57-58 which extends outwardly from the nose of the target aircraft in which no danger of closing aircraft can exist, provided all aircraft involved are flying in accordance with F.A.A. regulations at the proper assigned altitude. This cone of safety covers a 90° sector directly in front of the aircraft when it is flying either due West, as shown, or due East. As previously noted above, a 500 foot separation will be maintained in this zone for aircraft flying in the opposite direction or proceeding under other flight rules. All other aircraft not falling upon the range circle will, of course, pass harmlessly in front or behind the target aircraft.

The zone of safety illustrated in FIG. 5 continues to exist as the aircraft turns away from a due East or due West heading in either direction. That is to say, the zone's location remains in the same basic position but its angular relationship in regard to the aircraft changes in compliance with the number of degrees that the aircraft is turned away from the initial east or west heading. The angular relationship will continue to change until the aircraft has turned to either a heading that is due north or due south. At this time, one of the perpendicular legs of the zone will be aligned along the central axis or heading line of the aircraft while the other will be extended 90° therefrom. This extreme situation is depicted by lines 47 and 48 in FIG. 4. As can be seen in reference to FIG. 4, the zone of safety encompasses the entire area on the left-hand side of the target aircraft.

As will be explained in greater detail below, the continual existence of this zone of safety, which is provided by the operation of the F.A.A. regulations, forms the operational basis of the anti-collision plotter of the present invention.

Figure 1:
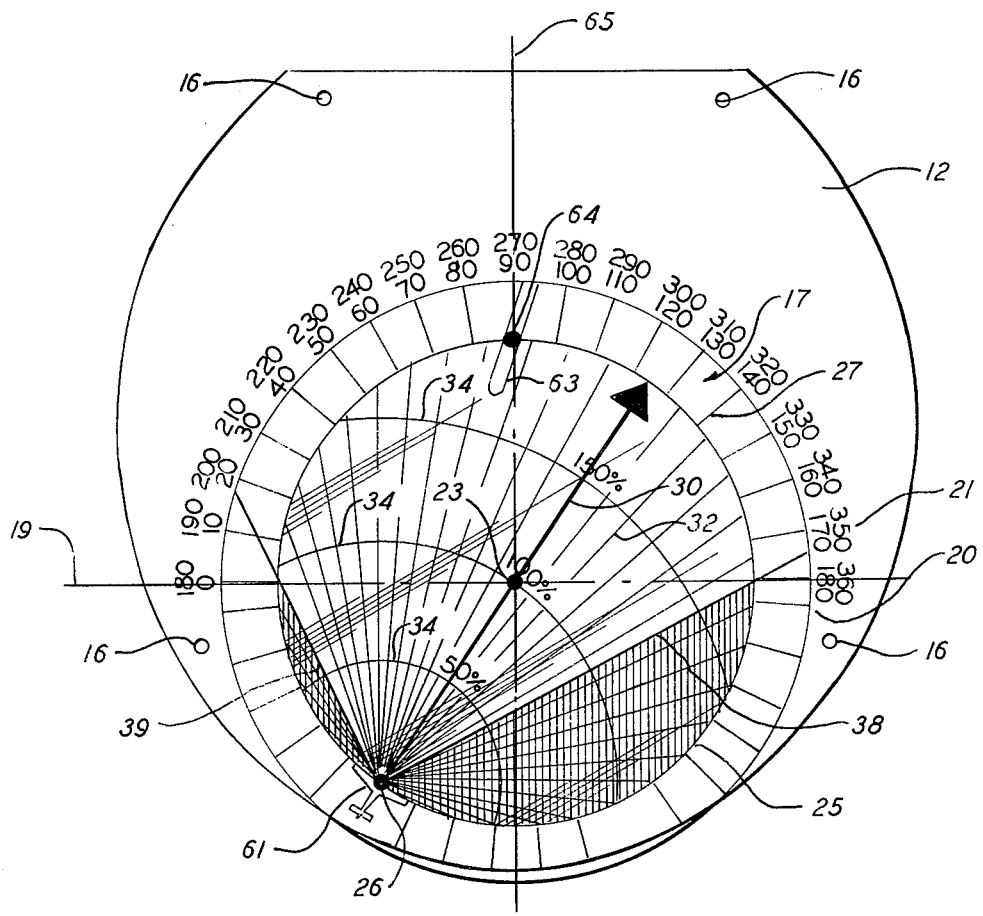
FIG. 1 is a plan view showing one embodiment of the present invention.
Figure 2:
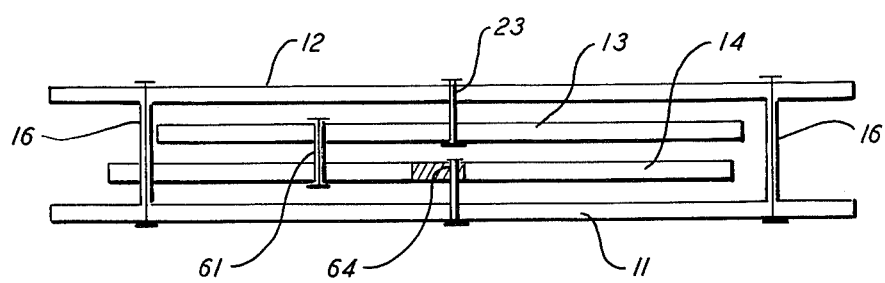
FIG. 2 is a sectional view through the device illustrated in FIG. 1, showing the relationship of the component parts thereof.
Figure 3:
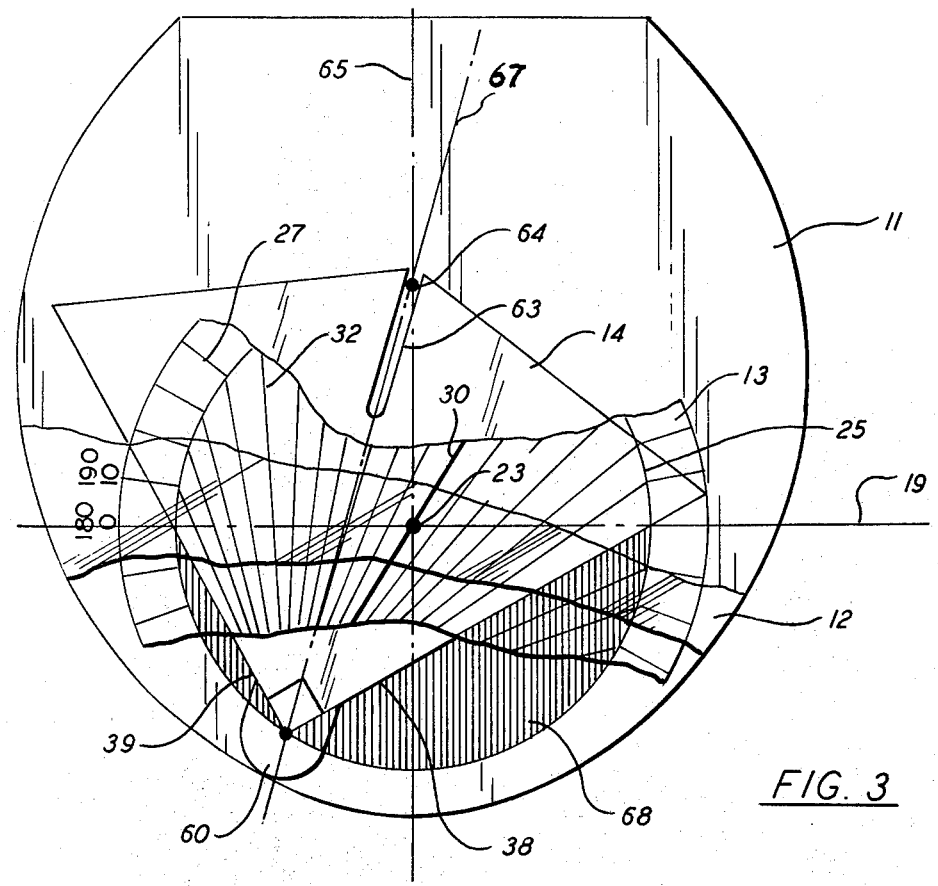
FIG. 3 is a fragmented view of the device shown in FIG. 1 with portions broken away to further illustrate the interrelationship of the component parts.

Turning now to FIGS. 1-3, sector plotter 10 is of relatively simple construction and includes a backplate 11, a coverplate 12, a course indicator dial 13 and a sector mask 14. The geometry of the coverplate substantially complements that of the backplate and the two elements are supported in spaced apart relationship by means of spacer screws 16. The size and shape of the plotter is such that it can be conveniently held and operated by hand.

A generally circular transparent window 17 is provided in the face of the coverplate. A semicircular compass rose is imprinted about the upper periphery of the window with the base of the semicircular compass being described by horizontal center line 19 of the plotter. The compass rose consists of an upper scale 21 and a lower scale 20, both of which are read in a clockwise direction. The lower scale extends from 0° to 180° in equal increments while the upper scale extends from 180° to 360° in similar equal increments. As will be explained below, the 0° to 180° scale is used to index the heading of a target aircraft flying in a generally easterly direction while the 180° to 360° scale is used to index the heading of a target aircraft flying in a generally westerly direction.

The course indicator dial, which is also formed of a transparent material such as plastic or the like, is rotatably mounted directly below the coverplate window by means of a pivot 23 which is axially aligned with the axial centerline of the window. A concentric range circle 25 is imprinted upon the dial and is clearly visible through the window. A simulated inflight target aircraft 26 is also imprinted upon the dial with the cockpit of the aircraft being positioned substantially upon the range circle with the nose of the aircraft pointed at the pivot 23.

In assembly, the outer periphery of the course indicator dial complements the periphery of the semicircular compass rose. The lower portion of the dial protrudes slightly beyond the lower portion of the coverplate and backplate and provides a means by which the indicator disc can be rotated. A series of equally spaced radial line segments 27 are drawn on the outer extremity of the indicator dial with the radial lines extending between the range circle and the outer periphery of the dial. These markings represent extensions of course line vectors and the spatial relationship of a closing aircraft that may be on the range circle and which might potentially collide with the target aircraft. As explained in reference to FIGS. 4 and 5 above, closing aircraft proceeding along any of these vectors will impact the target at the center of the range circle.

A grid is also imprinted over the range circle of the course indicator dial. A more pronounced heading line 30 is shown emanating from the nose of the target aircraft, the heading line passing through the center of the range circle and terminating in an arrow on the other side of the circle. The arrow provides a means by which the heading of the target aircraft is set into the compass rose. A series of secondary grid lines, of lesser definition, for example, line 32, also emanate from the nose of the target aircraft. Each of these secondary lines cut a chord upon the range circle. As explained above, these secondary lines represent the resultant or closing vectors of any identified closing aircraft which might be approaching the target aircraft along radical line segments 27. The length of the vector identifies the closing speed of the other aircraft while its position identifies its relative closing direction in respect to the target.

A plurality of arcuate shaped lines 34, which are concentric with the nose of the target aircraft, are also provided upon the grid. These lines give a reading to the pilot of the target of the closing speed expressed in a percentage of his own speed. As shown, the range circle grid is subdivided into four equal sections by lines 34, with the vector length of each section being equal to 50% of the target's speed.

Interposed below the course indicator dial and the backplate is a sector mask 14. The mask contains two perpendicular sides 38,39 which, in assembly, are arranged to intersect at the point where the cockpit of the target aircraft resides upon the range circle. A tab 60 (FIG. 3), dependent upon the mask, provides structure by which the mask is pivotally affixed to the course indicator dial. As best seen in FIG. 2, a pivot pin 61 is rotatably supported in the course indicator dial at the point where the cockpit of the target aircraft intersects the range circle line. The pin is passed downward into tab 60 to support the cojoined elements in movable relationship whereby movement of the dial will produce movement of the mask.

As best seen in FIG. 3, a slotted opening 63 is formed in the mask in which rides a stationary post 64 anchored in the backplate. The post is situated on the vertical centerline 65 of the plotter at the point where the centerline intersects the range circle. The slotted opening and post establish a cam and follower mechanism which both controls the motion of the sector mask in respect to the indicator dial and limits the extent to which the mask, and thus the dial, can be moved.

The slotted opening is axially aligned with line 67 that bisects the right angle formed by the two sides 38,39 of the mask. It should be evident by the arrangement that the two legs of the mask formed by sides 38 and 39 must pass through the base of the semicircular compass rose at the point where its base line crosses the range circle. This holds true regardless of the position of the course indicator dial. Movement of the indicator dial merely changes the size of the arc that are cut in the range circle by the legs of the mask. As seen in FIG. 1, when the heading indicator is set to an approximately 120° or 300° reading, the right hand side of the mask cuts a relatively large arc through the range circle while the left-hand leg cuts a relatively smaller arc. It should also be obvious from the discussion above that by setting the heading indicator to the 90° or 270° scale position, both legs of the mask will cut equal arcs on the range circle.

The depth to which the slotted opening is formed in the mask is controlled so that the post will bottom against the lower surface of the slotted opening when the heading indicator is turned to either of the two extreme compass rose positions, that is to either the 0°–180° scale position or the 180°–360° scale position. In this sense, the post performs an important secondary stop function in the operation of the present invention.

It should be further evident from the discussion above that the perpendicular sides of the mask simulate the heretofore mentioned cone of safety that is provided by operation of the F.A.A. regulations. Furthermore, through the interrelationship of the camming and stop mechanism and the pivot arrangement, the mask will be automatically moved to its proper position in respect to the target aircraft for any heading that is set into the plotter.

A color coded backing member 68 (FIG. 3), generally semicircular in form, is carried by the backplate. The backing piece complements the range circle inscribed upon the course indicator dial and is clearly visible through the coverplate window. In operation, the sector mask, which is formed of an opaque material, overlies the backing member and shields a selected portion thereof from view whereby only those sectors of the range circle cut by sides 38, 39 are delineated by the color coded backing member. Preferably, the backing member is colored red to indicate sectors of primary concern for an aircraft that is proceeding at a F.A.A. prescribed altitude.

The opaque mask can also be color coded to correspond with the color of the grid lines imprinted upon the heading indicator disc whereby the lines superimposed over the grid are less discernible than those overlying the red backing member.

While the primary function of the invention is to provide a pilot with priority information relative to his field of scan concerning other aircraft flying at the same F.A.A. prescribed altitude, it also has a secondary function of providing the pilot with similar priority information when he is flying at other than prescribed altitudes, as for example when climbing or descending through hostile altitudes. When the target aircraft is operating at an altitude other than that prescribed by F.A.A. regulations, the pilot is concerned with a different set of conditions than those previously described. Under these conditions, the 90° cone of safety becomes the danger area while the chords cut in the range circle by the legs of the cone represent the areas of safety. The vector lines depicted upon the grid, however, still represent valid representations of the closing speed and the direction of other aircraft plotted within the danger areas. Accordingly, the plotter of the present invention can be conveniently utilized when flying at other than prescribed F.A.A. altitudes.

The F.A.A. allows aircraft operating below prescribed minimum altitudes to fly at any indiscriminate altitude that is desired. This poses a yet another set of conditions in respect to collision potentials from those herein previously described. It is obvious that under these conditions that neither the course of the target aircraft or the course of any other aircraft flying in its vicinity at the same altitude are significant factors to be considered in regard to the overall directional orientation magnitude of collision potential with respect to the target aircraft. What is significant, however, is the fact that there exists an infinite number of closing vectors emanating from the nose of the target, regardless of its heading, which will cut sectors in the range circle. These vectors thus represent the relative magnitude of directionally oriented collision potential with respect to the target aircraft and any other closing aircraft. Significantly, the shortest vectors are always off the wings of the aircraft and the longest vectors are off the nose of the aircraft. Hence it is an important feature of the plotter of the present invention to provide a display wherein the vectors presented on the grid represent the relative magnitude of directionally oriented collision potential for any course that the target aircraft is flying when operating at uncontrolled altitudes between sea level and the minimally prescribed F.A.A. controlled altitudes. Accordingly, when a pilot is flying through these uncontrolled altitudes he can use the plotter of the present invention to rapidly determine the spatial orientation and potential closing velocity of aircraft observed in his immediate vicinity.

Figure 6:
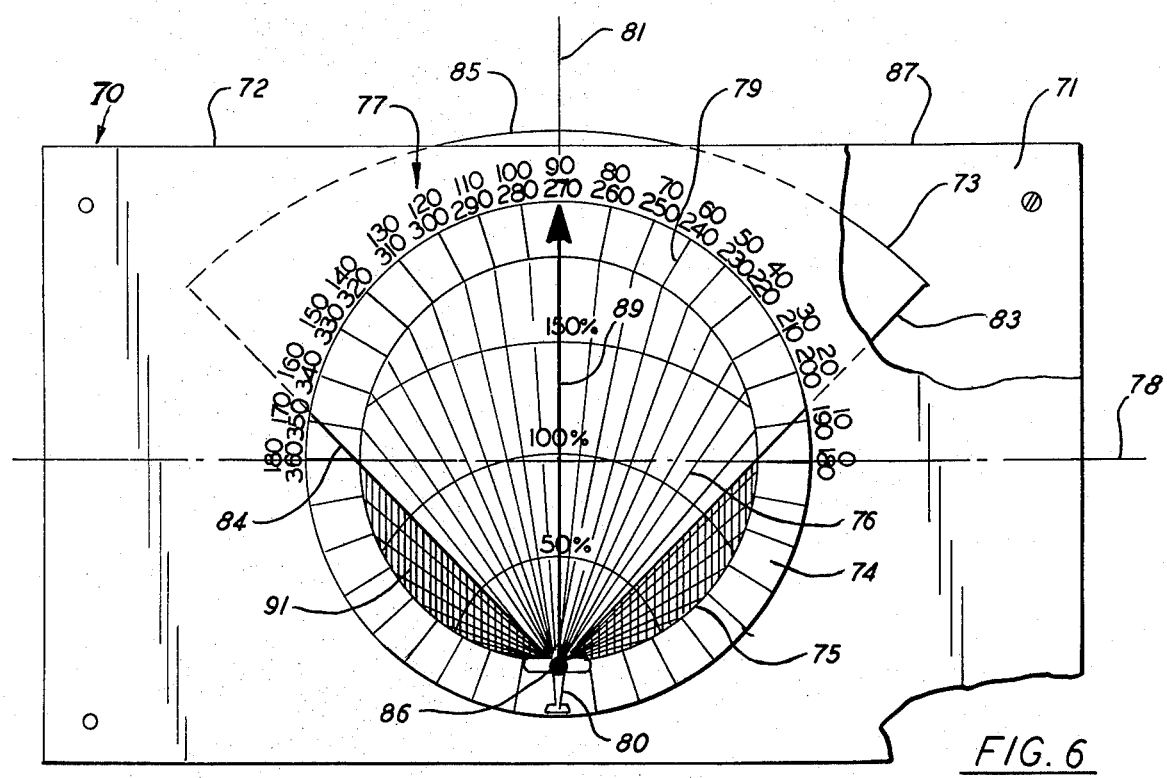
FIG. 6 is a plan view showing a second embodiment of the present invention.

FIG. 6 represents a simplified alternative embodiment of the present invention. As illustrated, plotter 70 includes spaced apart backplate 71 and coverplate 72 with a movable heading indicator 73 interposed therebetween. A transparent circular window 74 is provided in the face of the front plate. In this embodiment, a range circle 75 and a grid containing the closing vectors 76, as previously discussed, is imprinted directly upon the stationary window. A semicircular compass rose 77, whose base is formed by the horizontal centerline 78 of the plotter, is inscribed about the upper portion of the window. The compass has two reciprocal scales with the upper scale reading from 0°–180° and the lower scale reading from 180°–360°. In this case both scales are read in a counterclockwise direction.

A series of radial course lines 79 extend beyond the outer periphery of the window and the range circle to depict potential collision courses that may be flown by closing aircraft. A simulated target aircraft 80 is imprinted on the window with the nose of the aircraft located upon the range circle and the aircraft being aligned with the vertical centerline 81 of the plotter.

The movable heading indicator is a cone shaped segment having two perpendicularly aligned sides 83,84 and a curved surface 85 cojoining the two sides. A pivot pin 86 is passed through the simulated target aircraft at the range circle and rotatably supports the movable heading indicator at the apex formed by the two perpendicular sides. The curved surface 85 of the heading indicator is arranged to extend beyond the upper margin 87 of the plotter and provides a means by which the heading indicator can be moved. A centrally located heading line 89, which bisects the 90° angle between the two sides 83,84, is imprinted upon the top surface of the heading marker in bold print so that it is clearly discernible through the window. As can be seen in FIG. 6, when the heading marker is set at the 90°–270° position, the two sides of the movable heading indicator marker pass through the point where the base of the semicircular compass rose intersects the range circle.

A color coded backing member 91 is mounted on the inside surface of the backplate. The member is of sufficient size to encompass the area of the window so that the backing member visually identifies the critical sector formed in the range circle by the heading marker.

In this embodiment of the invention, the cone of safety is thus represented by the movable heading indicator while the position of the target aircraft remains stationary. In other words, by moving the heading indicator line to the desired course, the cone of safety described by the sides 83,84 of the indicator is properly orientated in reference to the nose of the target aircraft and thus provides a visual indication of those sectors surrounding the aircraft which are of primary concern to the pilot. The plotter is also read in the same manner as described above to provide both directional and rate of closure information when the target aircraft is proceeding under F.A.A. prescribed altitude regulations or when flying in or through hostile or uncontrolled altitudes.

While this invention has been described with reference to the structure disclosed above, it is not confined to the details as set forth and this application is intended to cover any modifications or changes that might come within the scope of the following claims.

I claim:

1. An airborne plotter for automatically providing a visual display containing potential collision information regarding closing aircraft flying at about the same altitude as the inflight first aircraft including
    a back plate and a cover plate supported in spaced apart relationship by spacer means;
    a transparent window provided in the face of the cover plate of the plotter having a semicircular compass rose imprinted thereon;
    a range circle also imprinted upon the window inside the compass rose and being concentric therewith;
    an opaque mask positioned behind the window and being pivotably secured between the plates in the plotter about a pivot means positioned upon the range circle at the point where a diameter of the circle perpendicular to the base of the semicircular compass rose intersects the circle opposite the compass rose, the mask having two perpendicular sides that intersect at the pivot point;
    a course index line inscribed upon the viewing face of the mask which bisects the right angle between the sides thereof for setting the aircraft course into the compass rose whereby the sides cut arcuate shaped sectors in the range circle that are indicative of zones of primary importance; and
    means to move said mask to a desired heading.

2. The plotter of claim 1 wherein a series of equally spaced radial lines extend outwardly from the periphery of the range circle which are indicative of the course lines of closing aircraft that will potentially impact said first aircraft.

3. The plotter of claim 2 having a grid overlying the range circle, the grid having a series of vectors extending between the pivot point and said radial course lines about the periphery of the range circle, said vectors representing the closing vectors between said first aircraft positioned at the pivot point and said closing aircraft positioned about the range circle.

4. The plotter of claim 3 wherein the grid further includes a series of arcuate lines concentric with the pivot point for subdividing the closing vectors into lengths based on said first aircraft's speed.

5. The plotter of claim 1 wherein the compass rose contains two scales, each of which is read in a counterclockwise direction, the first scale extending from 0° to 180° and the second from 180° to 360°.

6. The plotter of claim 5 further including a backing member positioned behind the mask and being viewable through said window, said backing plate being comprised of a color clearly discernible through said window that readily delineates the sectors of primary concern established by positioning of the mask.

7. An airborne plotter for providing potential collision information in regard to other aircraft flying about the same altitude of a first aircraft including
    a back-plate and a cover plate supported in spaced apart relationship by spacer means;
    a transparent window formed in the cover plate having a semicircular compass rose imprinted thereon;
    a transparent course indicator dial rotatably supported in the cover plate of the plotter upon a first pivot means located at the radial center of the compass rose, the dial having a range circle which is concentric with said radial center and a diameter which is smaller than the diameter of the compass rose;

an opaque mask having two perpendicular sides, the mask being pivotably supported in the course indicator dial upon a second pivot means at a point on the range circle, said two sides intersecting at said pivot point;

a stationary post supported in the back-plate of the plotter and being arranged to extend into a slotted opening formed in the mask that is axially aligned along the bisector of the right angle formed by said sides of said mask, the post being positioned on the range circle at the point where the radius of the compass rose normal to its base intersects the range circle; and means to set the indicator dial into the compass rose to the aircraft heading whereby the sides of the mask are automatically moved to cut arcuate sectors in the range circle which are of primary interest to the pilot of said aircraft.

8. The plotter of claim 7 wherein the course indicator dial contains a heading line which lies along the diameter of the range circle that passes through both the pivot point and the point of rotation of said dial by which the heading of the aircraft is set into the compass rose.

9. The plotter of claim 8 having a series of radial lines extending outwardly from the periphery of the range circle, said radial lines representing course lines of closing aircraft flying on collision courses with said first aircraft.

10. The plotter of claim 9 wherein a grid is imprinted upon the range circle having a series of vectors extending from the pivot point to said radial course lines, said vectors representing the resultant closing vectors between said first aircraft and said closing aircraft.

11. The plotter of claim 10 wherein the compass rose includes two coextensive clockwise reading scales, a first scale extending between 0° and 180° and the second scale extending between 180° and 360°.

12. The plotter of claim 11 wherein the depth of the slotted opening formed in the mask is cut to a predetermined depth whereby the bottom of the slot resides against the post when the heading indicator is moved to either the 0°–180° or 180°–360° scale positions.

13. The plotter of claim 12 wherein a backing member is carried by the back plate which underlies at least the viewable portions of the range circle, the member being colored to clearly delineate the sectors in the range circle established by the sides of the mask.

* * * * *